(12) United States Patent
Kedia et al.

(10) Patent No.: US 8,751,837 B2
(45) Date of Patent: *Jun. 10, 2014

(54) LOW-POWER SUBSYSTEM FOR PORTABLE COMPUTERS

(75) Inventors: Pankaj Kedia, Palo Alto, CA (US); James Kardach, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 1184 days.

This patent is subject to a terminal disclaimer.

(21) Appl. No.: 12/507,293

(22) Filed: Jul. 22, 2009

(65) Prior Publication Data

US 2009/0276330 A1    Nov. 5, 2009

Related U.S. Application Data

(63) Continuation of application No. 09/753,326, filed on Dec. 29, 2000, now Pat. No. 7,725,748.

(51) Int. Cl.
*G06F 1/32* (2006.01)
*G06Q 30/00* (2012.01)

(52) U.S. Cl.
USPC ............ 713/320; 713/300; 713/323; 704/275

(58) Field of Classification Search
USPC ........................... 713/300, 320, 323; 704/275
See application file for complete search history.

(56) References Cited

U.S. PATENT DOCUMENTS

| | | | | |
|---|---|---|---|---|
| 4,497,021 | A | | 1/1985 | Fukuda et al. |
| 5,287,485 | A | | 2/1994 | Umina et al. |
| 5,369,771 | A | * | 11/1994 | Gettel ........................... 713/322 |
| 5,487,181 | A | * | 1/1996 | Dailey et al. ................. 455/90.2 |
| 5,590,197 | A | | 12/1996 | Chen et al. |
| 5,768,164 | A | * | 6/1998 | Hollon, Jr. .................... 708/174 |
| 5,983,073 | A | | 11/1999 | Ditzik |
| 5,983,186 | A | | 11/1999 | Miyazawa et al. |
| 6,044,473 | A | * | 3/2000 | Kim .............................. 713/320 |
| 6,108,663 | A | | 8/2000 | Kableshkov |
| 6,240,521 | B1 | | 5/2001 | Barber et al. |
| 6,463,542 | B1 | * | 10/2002 | Yu et al. ........................ 713/320 |
| 6,658,576 | B1 | * | 12/2003 | Lee ............................... 713/320 |
| 6,836,850 | B2 | * | 12/2004 | Cheng ........................... 713/324 |
| 7,725,748 | B1 | * | 5/2010 | Kedia et al. ................... 713/323 |

* cited by examiner

*Primary Examiner* — M Elamin
(74) *Attorney, Agent, or Firm* — Jordan IP Law, LLC

(57) ABSTRACT

A low power subsystem for a portable computer is described. In one example, the portable computer includes a computer system and low power multimedia center. The computer system includes a central processing unit, a system memory, a mass storage device, and a user interface, the computer system having a low-power mode in which the CPU, system memory, and user interface are inactive. The low-power multimedia center includes a low power processor coupled to the mass storage device, a low power memory coupled to the low power processor, a miniature display to display multimedia from the mass storage device, and an external user interface coupled to the processor, independent of the computer system to control the displaying of multimedia.

20 Claims, 3 Drawing Sheets

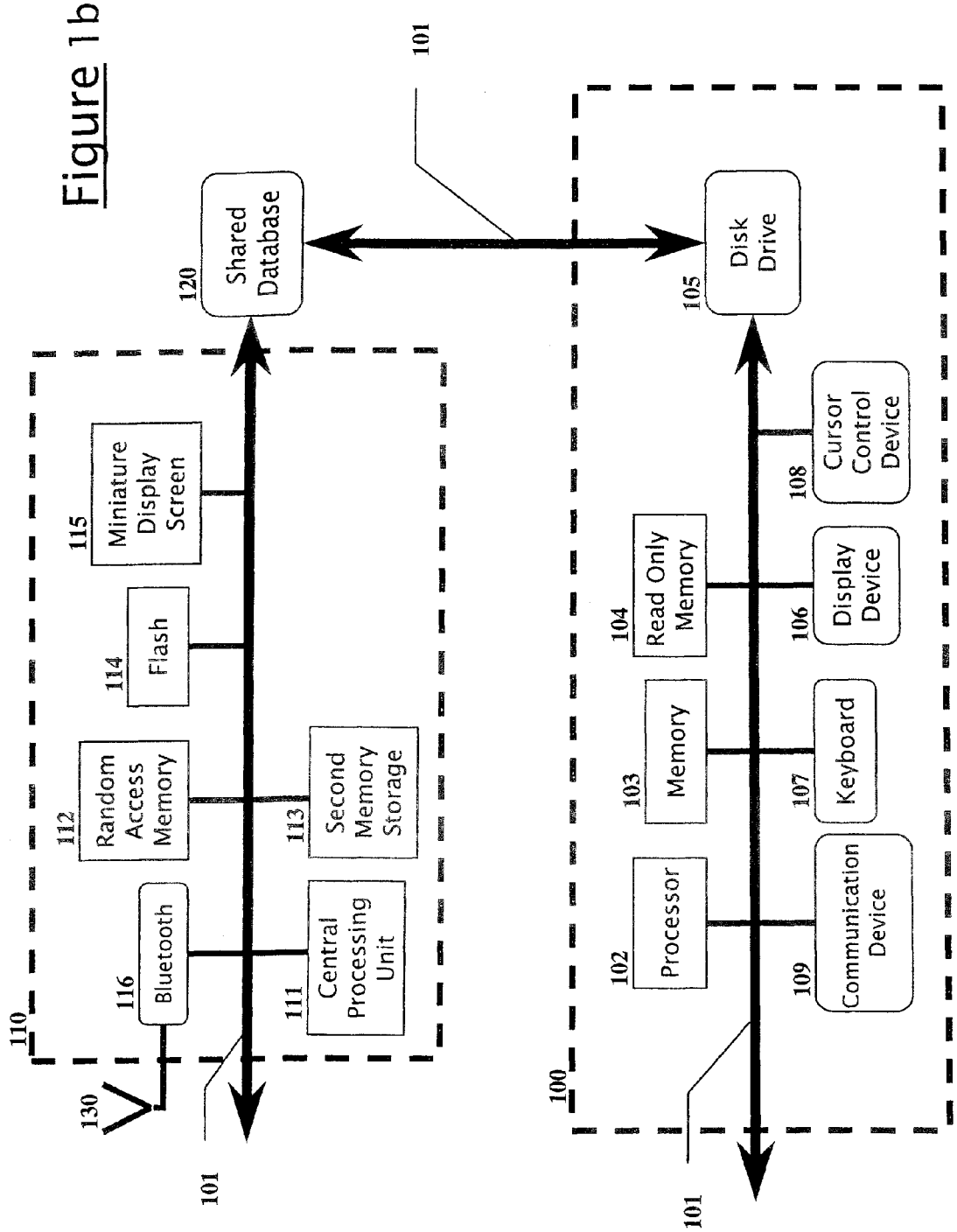

LOW-POWER SUBSYSTEM FOR PORTABLE COMPUTERS

BACKGROUND

This application is a Continuation Application of U.S. application Ser. No. 09/753,326, entitled LOW-POWER SUBSYSTEM FOR PORTABLE COMPUTERS, filed on Dec. 29, 2000, now U.S. Pat. No. 7,725,748, and priority is claimed thereof.

The modern trend in electrical appliances is mobility. People want to be able to use an electrical device from where they are at that instant. They want to be able to call people from anyplace they happen to be, hence the cell phone. They want to be able to listen to their own music no matter where they are, hence the portable compact disc player. They also want to be able to use their computer from almost anywhere, hence the notebook computer. The current design of the notebook computer has made this difficult. Specifically, using a computer while the subject is moving is currently exceedingly awkward.

The difficulty is related to the current design of notebook computers. The limited life of notebook computer batteries only allows for the computer to be on for a limited time. Battery conservation techniques include running the notebook in a state in which the central processing unit (CPU) is not active to conserve energy. Full access and control of a notebook's functionality often requires it to be in the open position, where the display screen and keyboard are at a right angle from each other. This L-shaped position is more difficult to carry around than the closed position. These difficulties become even more apparent in efforts to use notebooks as a method to electronically purchase items in a store. A further difficulty is created when attempting to either listen to or view multimedia entertainment data while either moving about or in a confined area, such as an airplane.

BRIEF DESCRIPTION OF THE DRAWINGS

FIG. 1a-b is a block diagram of the system according to one embodiment.

DETAILED DESCRIPTION

A low-power subsystem for a portable computer, which operates while the computer is in a low-powered mode in which the CPU performs in a less active state, is disclosed. Normally, when the notebook computer is in low power mode (also called powered down mode) during which the CPU is in a less active state and the notebook display screen may be in the closed position, the data stored within the computer typically cannot be accessed. One embodiment described herein allows access to the data while the computer is low power mode by use of a low-power subsystem (LPS) in the computer with access to the same memory storage as the CPU. The subsystem acts independently of the CPU, which would not be able to perform the necessary functions during low power mode. The subsystem allows the notebook to perform several functions while in the low power mode, such as, for example, act like a travel assistant for the user, provide entertainment, and make electronic purchases.

A notebook will go into low power mode either when the user has left the notebook idle for a time period previously specified by the user, or when the user has closed the notebook. In one embodiment, the LPS is activated when the notebook enters low power mode, and remains active until the CPU is activated or until the computer system is turned off. In an alternate embodiment, the LPS would remain inactive until the user turns the LPS on and would remain on until the user deactivates the LPS, activates the CPU, or turns off the notebook.

Figure 1A:
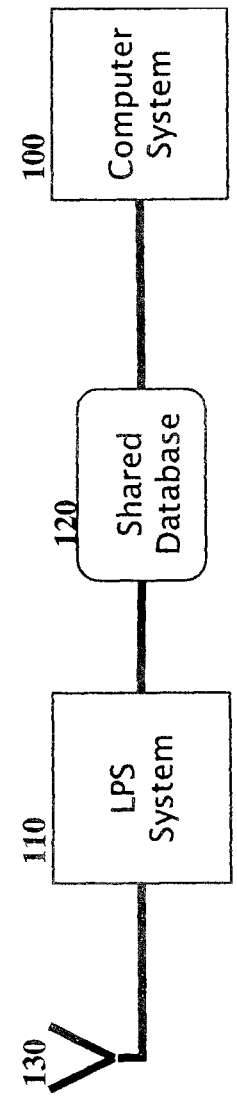

FIG. 1(a) illustrates an embodiment of a computer system in which a low-power subsystem 110 is coupled to a shared database 120. The shared database 120 is synchronized with the memory components of a computer system 100, allowing a user to access data stored in the notebook computer system through the LPS. In one embodiment the LPS is embedded in the computer system. In one embodiment, the subsystem is coupled to a wireless interface 130, by which the user can exchange data with the notebook and the notebook can exchange data with a network. The shared database 120 is in operation while the subsystem 110 is in operation.

FIG. 1b shows a more detailed view of the architecture of the subsystem and of the computer system to which the subsystem is coupled. Computer system 100 includes a bus or other communications device 101 for communicating information, and a processing unit such as processor 102 coupled with bus 101 for processing information. Computer system 100 further includes a random access memory (RAM) or other dynamic storage device 103 (commonly referred to as memory), coupled to bus 101 for storing information and instructions to be executed by processor 102. Memory 103 also may be used for storing temporary variables or other intermediate information during execution of instructions by processor 102. Computer system 100 may also include a read only memory (ROM) and /or other static storage device 104 coupled to bus 101 for storing static information and instructions for processor 102. The memory and/or the ROM may be referred to herein as a storage device.

A disk drive 105 such as a magnetic disk or optical disk may also be coupled to computer system 100 for storing information and instructions. Computer system 100 can also be coupled via bus 101 to a display device 106, such as a cathode ray tube (CRT) or a liquid crystal display (LCD), for displaying information to a computer user. For example, image, textual, or graphical depictions of product data and other types of image, graphical, or textual information may be presented to the user on display device 106. Typically, an alphanumeric input device 107, including alphanumeric and other keys, is coupled to bus 101 for communicating information and/or command selections to processor 102. Another type of user input device is cursor control device 108, such as a conventional mouse, trackball, or other type of cursor direction keys for communicating direction information and command selection to processor 102 and for controlling cursor movement on display 106. A communications device 109, such as a modem, may also be coupled with the computer system. The shared database 120, in one embodiment, is coupled to the computer system 100 via the disk drive 105, as the disk drive 105 is the database's most frequent point of access.

An embodiment of the subsystem is also illustrated in detail in FIG. 1(b). In one embodiment, the low-power subsystem 110 includes a processor 111 and a random access memory (RAM) 112. In an alternative embodiment, the low-power embedded subsystem also contains secondary memory storage 113, to store frequently accessed information. In one embodiment, the low-power embedded subsystem may also include a Flash memory 114. In one embodiment, a miniature display screen 115 could be included in the LPS to display data when the main screen 106 of the notebook is closed. The low-power embedded subsystem, in an alternate embodiment, can further comprise a device to allow the interface 130 to be a wireless interface 116, such as Bluetooth®. The shared database 120 would allow the subsystem 110 to have access to the hard drive storage 109 device of the notebook 100. In alternative embodiments, the shared database 120 would also have access to other memory devices such as the memory 106 of the notebook 100 or the ROM 108.

The low-power subsystem 110 allows the notebook 100 to act as a personal server. In one embodiment, the notebook could act as a travel assistant. The notebook, in the closed powered down position, would be kept in a traveling case. As the notebook would be in low power mode, there would be less drain on the battery. In one embodiment, the shared database 120 would have access to the travel information contained in the hard drive 105, the memory 103, or the ROM 104. In a further embodiment, the shared database may access a variety of data, including, for example, memos, maps, calendars, and/or other information helpful for traveling. The information could be presented over headphones or as visual display on a miniature display screen 115. In one embodiment, the data could be sent over the wireless interface 130 to the user's cellular phone. In a further embodiment, the low-power subsystem can use the cellular phone to access a network.

In an alternate embodiment, the notebook acts as a multimedia center for the user. The notebook could store multimedia data on the notebook's hard drive 105 or access the multimedia data from a network. The multimedia data is then accessed by the low-power subsystem 110 through the shared database 120. It can then be presented to the user over headphones or displayed over a miniature display screen 115.

In an alternate embodiment, the user can use the wireless interface with the notebook to make electronic purchases at a store set up for electronic purchases. The wireless interface of the notebook, operating off the low-power subsystem at low power, sends a signal from the user to a server at the store to indicate interest in purchasing an item. In one embodiment, the item purchased is electronic data, such as a video or an MP3 file. That data is then sent to the user's notebook over the wireless interface, and the user is charged accordingly. The user can then store the data on the hard drive or on the shared database and listen to or view the data later while the notebook is in low power mode.

Figure 2:
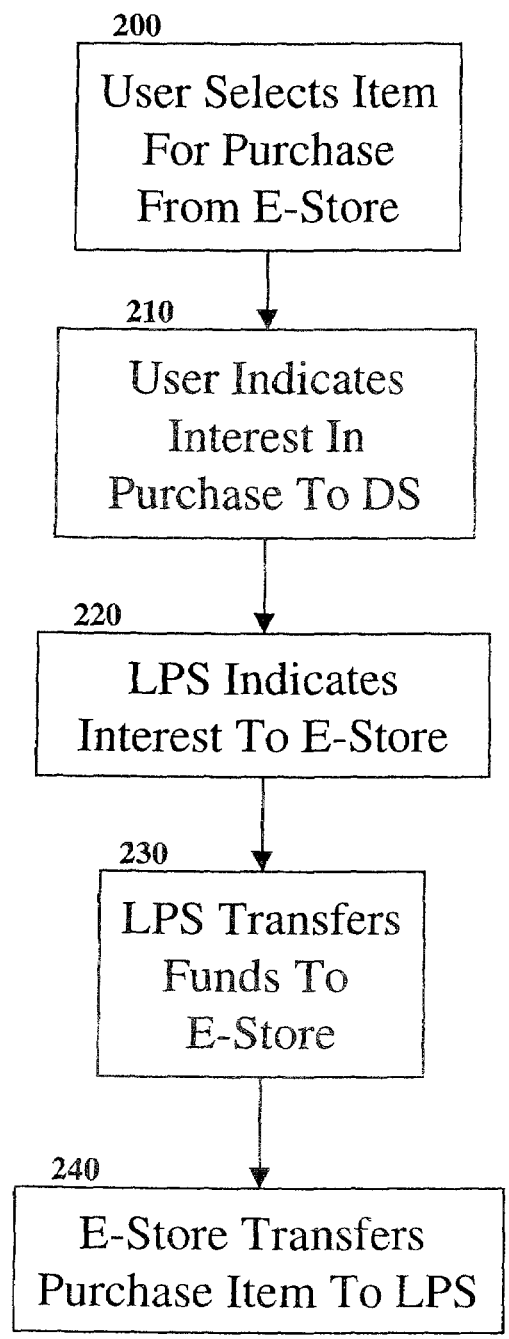
FIG. 2 is a flowchart describing steps of using verbal commands with a computer system according to one embodiment.

An embodiment of this method of purchasing data at an electronic store is illustrated by the flowchart in FIG. 2. First, the user selects an item for purchase, such as a multimedia (e.g. a video or MP3), from an electronic store, or e-store 200. The user then indicates his interest in purchasing the item, possibly via a voice command, to the low-power subsystem (LPS) 210. The low-power subsystem then communicates to the e-store that the user wishes to purchase the selected item 220. The low-power subsystem then transfers the necessary funds to the e-store 230. The e-store transfers the purchase item electronically over the wireless interface to the low-power subsystem 240.

The method described above can be stored in the memory of a computer system (e.g., set top box, video recorders, etc.) as a set of instructions to be executed. In addition, the instructions to perform the method described above could alternatively be stored on other forms of machine-readable media, including magnetic and optical disks. For example, the method of the present invention could be stored on machine-readable media, such as magnetic disks or optical disks, which are accessible via a disk drive (or computer-readable medium drive). Further, the instructions can be downloaded into a computing device over a data network in a form of compiled and linked version.

Alternatively, the logic to perform the methods as discussed above, could be implemented in additional computer and/or machine readable media, such as discrete hardware components as large-scale integrated circuits (LSI's), application-specific integrated circuits (ASIC's), firmware such as electrically erasable programmable read-only memory (EEPROM's); and electrical, optical, acoustical and other forms of propagated signals (e.g., carrier waves, infrared signals, digital signals, etc.); etc.

Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A non-transitory storage media, comprising:
   instructions for a personal computer operating system, the instructions, when executed by the personal computer, cause the personal computer to:
   enable a processing unit of the personal computer to transition into a low power mode, the personal computer having a memory to be accessible to the processing unit; and
   allow a low power subsystem, which includes a low power processor, an external interface and a low power memory to access data contained within the personal computer memory using the low power processor when the processing unit is in the low power mode.

2. The non-transitory storage media of claim 1, in which the personal computer is to operate as a server to the low power subsystem, which is to operate as a client.

3. The non-transitory storage media of claim 1, in which the processing unit can go into the low power mode when a user has left the personal computer idle for a time period previously specified by the user or by a different user.

4. The non-transitory storage media of claim 1, in which the processing unit can go into the low power mode when a user has closed a hinged panel of the personal computer.

5. The non-transitory storage media of claim 1, in which the low power sub-system is detachable from the personal computer.

6. The non-transitory storage media of claim 1, in which data is accessed by the low power subsystem from a shared database.

7. The non-transitory storage media of claim 6, in which the shared database is implemented with memory that is within the low power sub-system.

8. The non-transitory storage media of claim 6, in which the operating system enables the shared database to be synchronized with the personal computer memory, thereby allowing a user to access data stored in the personal computer by way of the low power sub-system.

9. The non-transitory storage media of claim 1, in which the low power sub-system is to exchange data with the personal computer through a wireless interface.

10. A method for an operating system in a personal computer, the method comprising:
    transitioning of a processing unit of the personal computer into a low power mode, the personal computer having a memory that is accessible to the processing unit; and
    accessing by a low power subsystem, which includes a low power processor, an external interface and a low power memory to data contained within the personal computer memory using the low power processor when the processing unit is in the low power mode.

11. The method of claim 10, in which the personal computer is to operate as a server to the low power subsystem, which is to operate as a client.

12. The method of claim 10, in which the processing unit can go into the low power mode when a user has left the personal computer idle for a time period previously specified by the user or by a different user.

13. The method of claim 10, in which the processing unit can go into the low power mode when a user has closed a hinged panel of the personal computer.

14. The method of claim 10, in which the low power subsystem is detachable from the personal computer.

15. The method of claim 10, in which data is accessed by the low power sub-system from a shared database.

16. The method of claim 15, in which the shared database is implemented with memory that is within the low power sub-system.

17. The method of claim 15, in which the operating system enables the shared database to be synchronized with the personal computer memory, thereby allowing a user to access data stored in the personal computer by way of the low power sub-system.

18. The method of claim 10, in which the low power sub-system is to exchange data with the personal computer through a wireless interface.

19. An apparatus comprising:
  a processing unit of a personal computer to transition into a low power mode, the personal computer having a memory to be accessible to the processing unit; and
  a low power subsystem, which includes a low power processor, an external interface and a low power memory to access data contained within the personal computer memory using the low power processor when the processing unit is in the low power mode.

20. The apparatus of claim 9, wherein the personal computer is to operate as a client to the low power subsystem, which is to operate as a client.

* * * * *

UNITED STATES PATENT AND TRADEMARK OFFICE
CERTIFICATE OF CORRECTION

PATENT NO. : 8,751,837 B2  
APPLICATION NO. : 12/507293  
DATED : June 10, 2014  
INVENTOR(S) : Pankaj Kedia et al.

Page 1 of 1

It is certified that error appears in the above-identified patent and that said Letters Patent is hereby corrected as shown below:

In the Claims:

In column 6, line 17, in claim 20, delete "claim 9" and insert -- claim 19 --, therefor.

Signed and Sealed this
Fourth Day of November, 2014

Michelle K. Lee
*Deputy Director of the United States Patent and Trademark Office*